US006862671B1

(12) United States Patent
Bergsten (10) Patent No.: US 6,862,671 B1
(45) Date of Patent: *Mar. 1, 2005

(54) SYSTEM AND METHOD FOR OPTIMIZING ESTABLISHMENT OF MIRRORED DATA

(75) Inventor: James R. Bergsten, Saratoga, CA (US)

(73) Assignee: LSI Logic Corporation, Milpitas, CA (US)

(*) Notice: Subject to any disclaimer, the term of this patent is extended or adjusted under 35 U.S.C. 154(b) by 593 days.

This patent is subject to a terminal disclaimer.

(21) Appl. No.: 09/923,155

(22) Filed: Aug. 6, 2001

(51) Int. Cl.[7] .............................................. G06F 12/16
(52) U.S. Cl. ...................... 711/162; 711/161; 711/168; 711/202; 711/209; 707/204; 714/6
(58) Field of Search ................................ 711/112, 114, 711/161, 162, 168, 202, 209; 714/6; 707/202, 204

(56) References Cited

U.S. PATENT DOCUMENTS 5,640,561 A * 6/1997 Satoh et al. ................. 707/202
5,649,152 A * 7/1997 Ohran et al. ................. 711/114
6,035,412 A * 3/2000 Tamer et al. .................... 714/6
6,324,654 B1 * 11/2001 Wahl et al. ...................... 714/6
6,499,091 B1 * 12/2002 Bergsten ...................... 711/162

* cited by examiner

Primary Examiner—Pierre M. Vital
(74) Attorney, Agent, or Firm—Suiter West PC LLO (57) ABSTRACT

The present invention is directed to a system and method for optimizing establishment of mirrored data. In an aspect of the present invention, a method of tracking changes to mirrored storage system including a first storage device and a second storage device may include creating a map including at least one map entry having an identifier suitable for describing a range of addressable data blocks. The range of addressable data blocks includes at least one data block modified after operation of the first storage device is suspended. At least one of a range of addressable data blocks described by at least one map entry of the map and a number of map elements copied per establish command is specified. The map including the at least one map entry on the second storage device is stored. The map is suitable for being utilized to restore data stored on the second storage device to at least one of the first storage device and a third storage device.

23 Claims, 7 Drawing Sheets

SYSTEM AND METHOD FOR OPTIMIZING ESTABLISHMENT OF MIRRORED DATA

FIELD OF THE INVENTION

The present invention generally relates to the field of mirrored data storage systems, and particularly to a system and method for optimizing establishment of mirrored data.

BACKGROUND OF THE INVENTION

The reliable storage of computer data is one of the most important aspects of modern life. From applications and programs, to credit information, web sites, and the like, some of the most important aspects of an individual's life are stored in an electronic form. One of the problems facing electronic storage is device failure and the subsequent loss of data. One of the methods utilized to lessen the chance of data device failure, and the resulting loss of information, is the use of mirrored data storage devices.

Mirrored data storage devices are devices in which data is written to at least two devices simultaneously. In this way, if one of the devices fail, the system may switch to the other device without a loss of data or service. Mirroring is useful as a way to keep data accessible in a reliable manner. However, although the data is typically available when one of the devices is suspended, such as when an interruption in operation occurs, it is still desirable to enable the data on the working subsystem to be mirrored on an additional device. In other words, to return the system to full operational status in case the remaining working subsystem suffers an operational failure, such as by returning the suspended device to operational status, using a replacement device, and the like.

To accomplish this, mirrored devices previously copied all the data from the operational device to the suspended storage device. However, this may take a significant amount of time to perform, thereby causing a decrease in system resources. One method utilized to address this problem involved the transfer of only the data changed since the mirrored storage device became suspended. This was accomplished with a type of log or map that was maintained to track the data not transferred to the mirror. However, as storage devices became larger, the storage and processing required for maintaining this map has become increasingly larger.

Therefore, it would be useful to provide an improved system and method for optimizing establishment of mirrored data.

SUMMARY OF THE INVENTION

The present invention is directed to a system and method for optimizing establishment of mirrored data. In a first aspect of the present invention, a method of tracking changes to mirrored storage system including a first storage device and a second storage device includes creating a map including at least one map entry having an identifier suitable for describing a range of addressable data blocks. The range of addressable data blocks includes at least one data block modified after operation of the first storage device is suspended. At least one of a range of addressable data blocks described by at least one map entry of the map and a number of map elements copied per establish command is specified. The map including the at least one map entry on the second storage device is stored. The map is suitable for being utilized to restore data stored on the second storage device to at least one of the first storage device and a third storage device.

In a second aspect of the present invention, a system for storing data includes a first storage device and a second storage device. The first storage device and the second storage device are suitable for receiving and storing data in a mirrored fashion. When operation of the first storage device is suspended, at least one map entry is incremented. The map entry includes an identifier suitable for describing a range of addressable data blocks modified after operation of the first storage device is suspended. At least one of a range of addressable data blocks described by the map entry and a number of map entries copied per establish operation is specified.

In a third aspect of the present invention, a method of tracking data changes to mirrored storage devices including a first storage device and a second storage device includes creating a map. The map includes at least one map entry having an identifier suitable for describing a range of addressable data blocks. The range of addressable data blocks includes at least one data block modified after operation of the first storage device is suspended. The map including the at least one map entry on the second storage device is stored. The map is suitable for being utilized to restore data stored on the second storage device to at least one of the first storage device and a third storage device. A number of map elements copied per establish command is specified.

In a fourth aspect of the present invention, a method of tracking data changes to mirrored storage system including a first storage device and a second storage device includes specifying at least one of a range of addressable data blocks described by at least one map entry of a map and a number of map elements copied per establish command. A map is created including at least one map entry having an identifier suitable for describing a range of addressable data blocks. The range of addressable data blocks includes at least one data block modified after operation of the first storage device is suspended. The map including the at least one map entry is stored on the second storage device. The map is suitable for being utilized to restore data stored on the second storage device to at least one of the first storage device and a third storage device.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 7, exemplary embodiments of the present invention are shown. Mirrored storage systems, such as mirrored disk drives and the like, generally include at least two mirrored sets of data to permit access to the data in the event one of the subsystems fails. However, in the event of failure of one of the subsystems, it is still desirable to restore the system to full operational status to further protect the data from further system failures in the most efficient manner possible. Such an efficiency may be promoted by allowing a user to specify a number of blocks traced per map element, the number of map elements copied per establish/re-establish range, and the like. Thus, a user may shrink and/or expand the ranges allowing control over the granularity of an establish operation, and allows a user to concatenate ranges allowing for faster establish times, such as by decreasing a number of distinct I/O operations performed.

Figure 1:
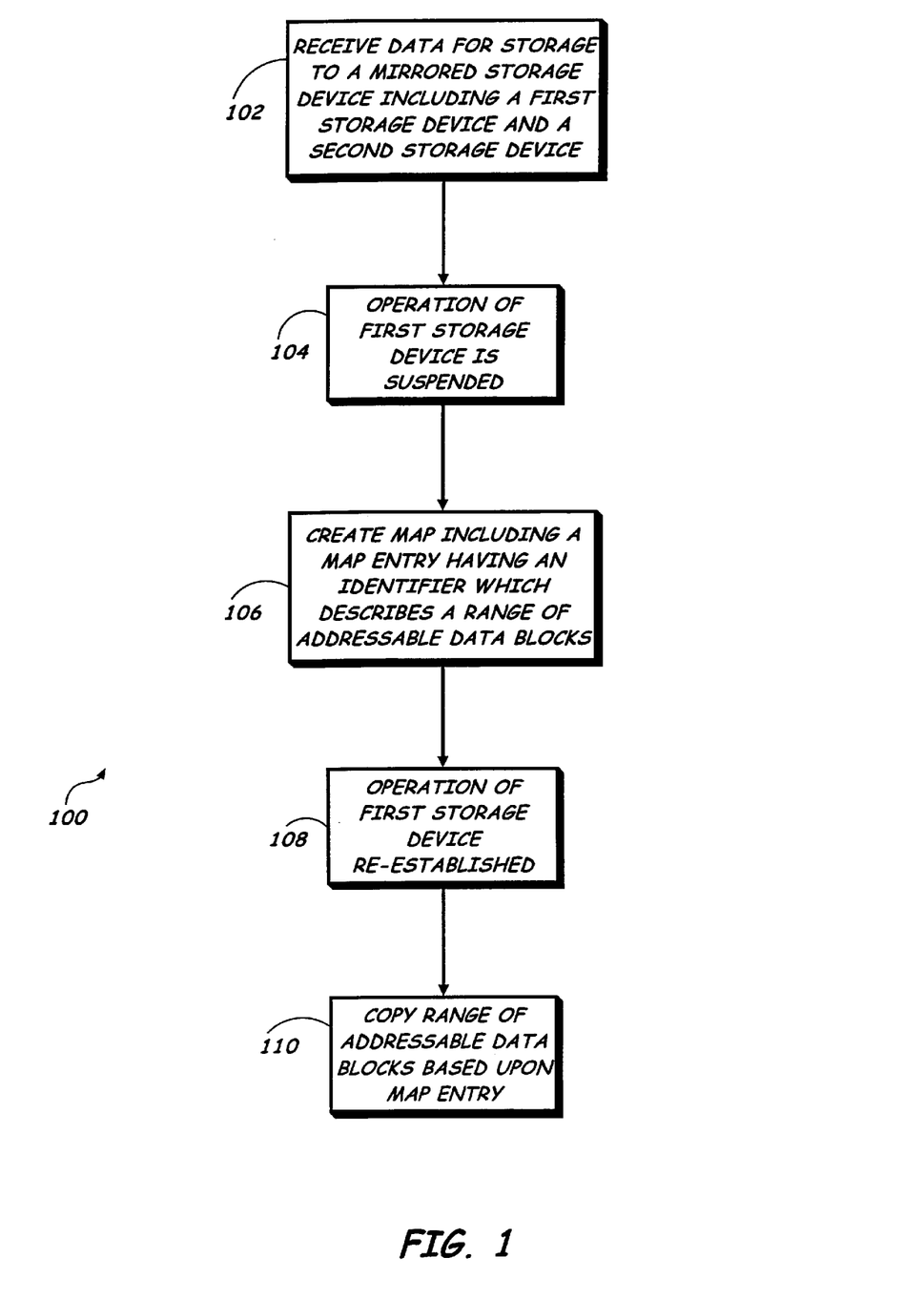
FIG. 1 is a flow chart depicting an exemplary embodiment of the present invention wherein data is restored to a mirrored device utilizing a map including a map entry having an identifier which describes a range of addressable data blocks.

Referring now to FIG. 1, an exemplary embodiment 100 of the present invention is shown wherein data is restored to a mirrored device utilizing a map including a map entry having an identifier, which describes a range of addressable data blocks. A mirrored storage device receives data, the mirrored storage device including a first storage device and a second storage device 102. However, operation of the first storage device may be suspended 104, such as due to operational failure, data transfer failure, and the like, thereby preventing the first storage device from receiving and storing data.

Therefore, a map is created, the map including a map entry having an identifier that describes a range of addressable data blocks 106. The map and the map entries include addressable data blocks that were modified after the suspension of the first storage device. Preferably, the map entry must have enough resolution to include a number from zero to n, wherein n is the number of data or cache blocks in the range. Thus, once operation of the first storage device is re-established 108, the range of addressable data blocks described by the map and the included map entries are copied to the first storage device 110. In this way, the storage system is returned to full operational status, with both the first storage device and the second storage device having the same, updated, mirrored data. Moreover, each map entry of the map may describe a greater amount of modified data in an efficient and space-saving manner.

Figure 2:
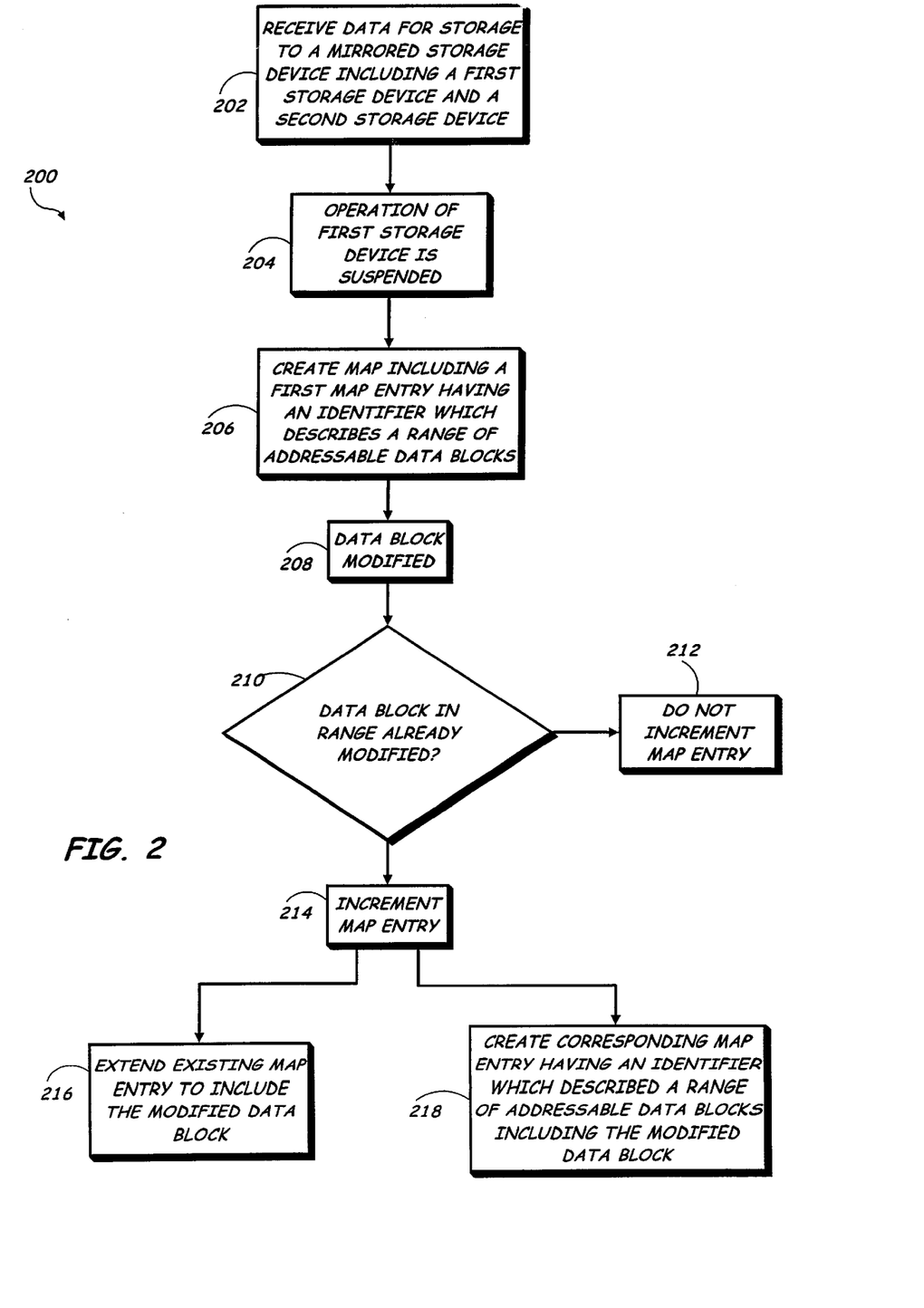
FIG. 2 is a flow chart illustrating an exemplary embodiment of the present invention wherein modification of data blocks is monitored and a map entry incremented if the data block is noted in a previously stored map entry.

Referring now to FIG. 2, an exemplary embodiment 200 of the present invention is shown wherein modification of data blocks is monitored and a map entry incremented if the data block is not described in a previously stored map entry. A mirrored storage system including a first storage device and a second storage device receives data for storage 202. Operation of the first storage device is suspended 204, such as due to hardware or software failure. A map is created including map entries having an identifier which describes a range of addressable data blocks 204, the data blocks modified after suspension of the first storage device. The map may be stored to nonvolatile storage so that the mirror state may be restored following a storage subsystem or other failure. An additional data block is then modified 208. If the additional data block is already in the range described by the map entry 210, the map entry is not incremented 212. However, if the data block is not in the range of data blocks described by the map entry 210, the map entry is incremented 214. Incrementing a map entry may include extending the range described by an existing map entry to include the modified data block 216, creation of a corresponding map entry having an identifier which describes a range of addressable data blocks including the modified data block 218, and the like as contemplated by a person of ordinary skill in the art. Thus, the size of the range may be modified, thereby adjusting the granularity of the map identifiers.

Figure 3A:
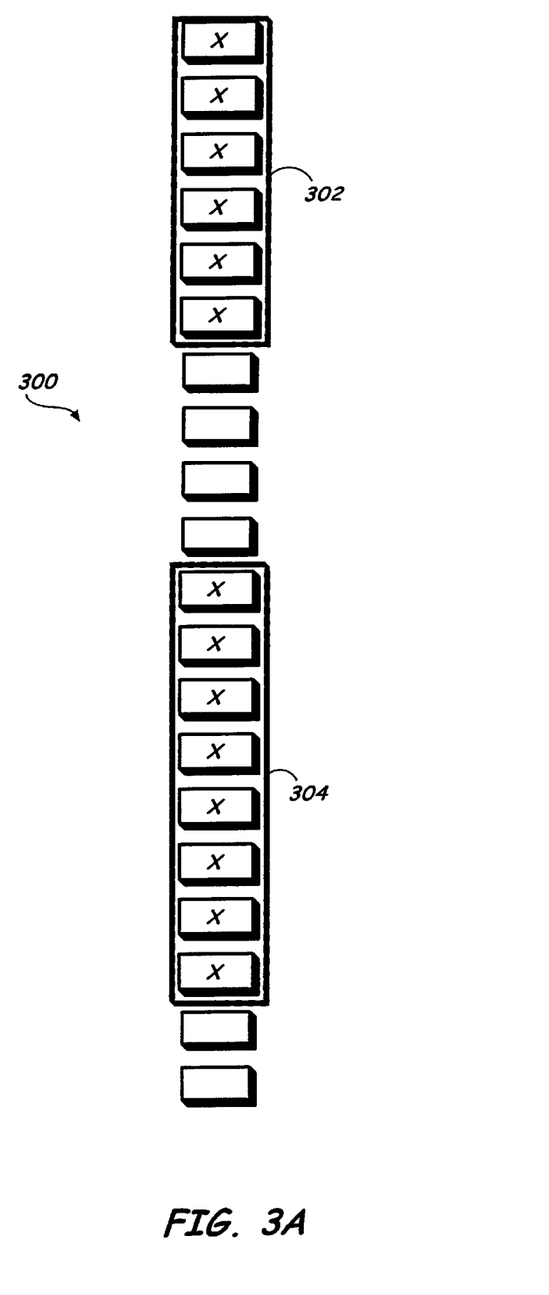
FIGS. 3A and 3B are block diagrams illustrating the adjustment of a range included in a map entry to modify the granularity of a map.
Figure 3B:
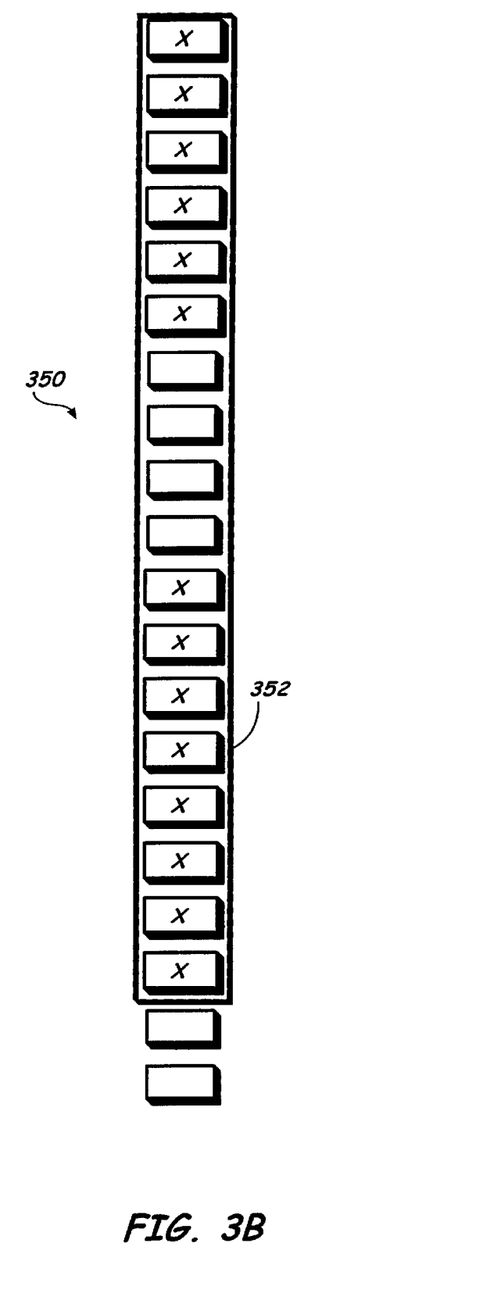

Referring now to FIGS. 3A and 3B, exemplary embodiments 300 and 350 of the present invention are shown wherein the adjustment of a range included in a map entry to modify the granularity of a map and map entries is described. Modified data blocks are depicted as including an "X", wherein unmodified data blocks do not contain an "X". As shown in FIG. 3A, a map may contain a map entry that describes a range of addressable address blocks 302 and 304. By limiting the range described by the identifier, a more precise description of the address blocks that are modified may be achieved and therefore less extraneous information needs to be copied to update the suspended device. However, such a range may result in a larger map, as more map entries are required to describe the modified address blocks. If a larger range is permitted to be described by an identifier included in a map entry 352, fewer map entries are needed, thereby permitting a smaller map to be created and stored. However, it may be more likely that unmodified data blocks are included in the map entry 352 description. Therefore, once the blocks are copied over to the previously suspended storage device, more blocks are transferred than are actually required, thereby requiring greater system resources.

The granularity of the map and map entries may be adjusted based upon the available resources. For example, a map containing map entries describing smaller ranges may be utilized if there is an abundance of storage space. However, upon approaching the limit of the storage space, the range described by the identifier may be expanded, thereby permitting a greater amount of addressable data block to be described by the map entry, thus, permitting smaller map to be stored. It should be apparent that the granularity of the map entries of the present inventions may be modified for a variety of reasons and motivations as contemplated by a person of ordinary skill in the art without departing from the spirit and scope of the present invention.

Additionally, a map may be pre-allocated such as to increase performance. For example, a map may be made of a fixed size, wherein each map entry describes a range. Therefore, each map entry may be incremented to describe a change to the corresponding range it describes. Further, the map entry may be decremented to described when that range was written successfully to the desired device. The size of the ranges described may be user specified to permit a user defined degree of granularity. In this way, a user may specify in which way to allocate a trade off between the range described and therefore the amount of information that must be written to the desired device and the size of the map itself.

Figure 4:
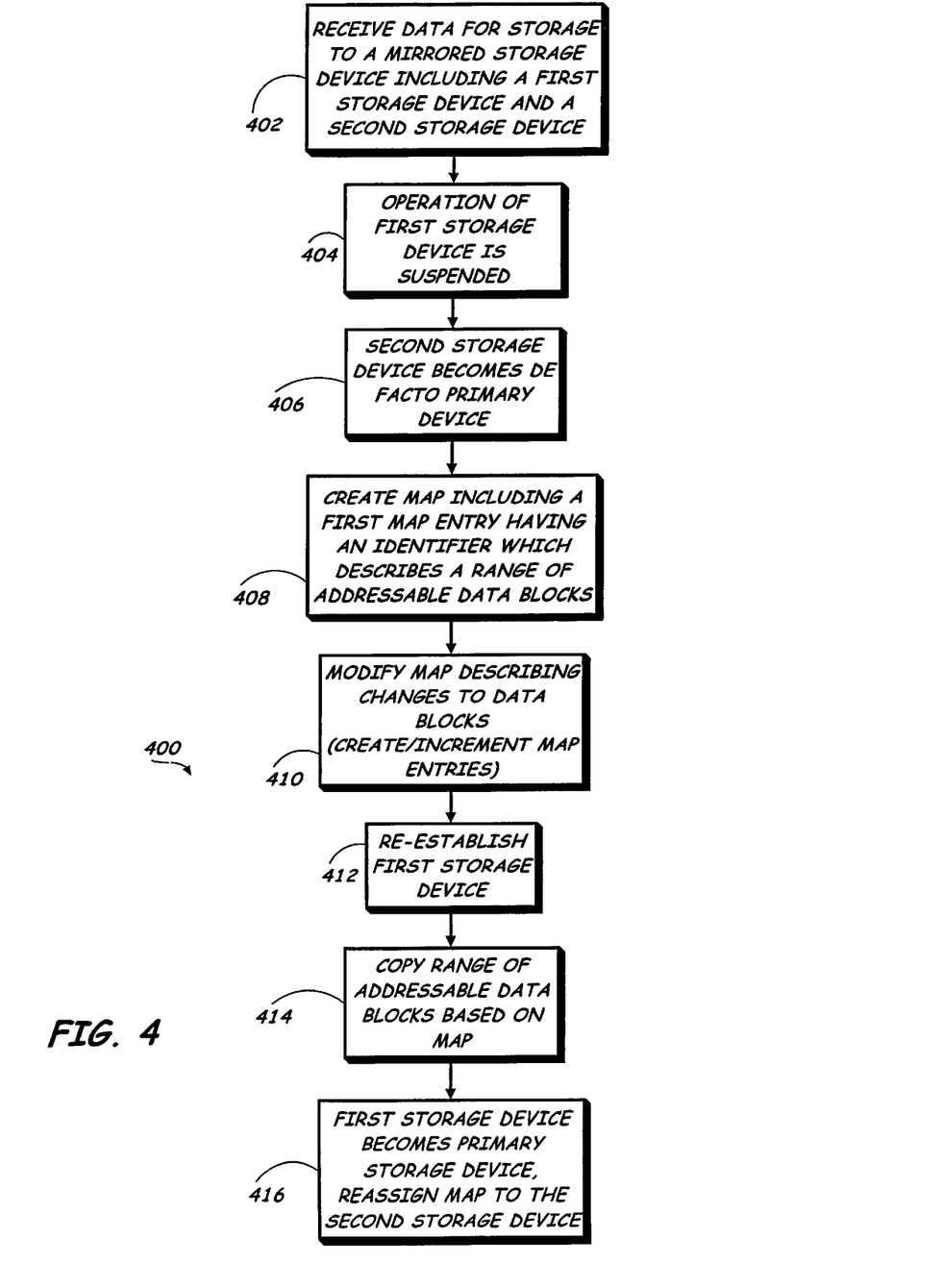
FIG. 4 an flow chart depicting an exemplary embodiment of the present invention wherein a mirrored storage device is restored based upon a map including a map entry having an identifier which describes a range of addressable data blocks at least one of which was modified after the suspension of a mirrored storage device.

Referring now to FIG. 4, an exemplary embodiment 400 of the present invention is shown wherein a mirrored storage device is restored based upon a map including a map entry having an identifier which describes a range of addressable data blocks at least one of which was modified after the suspension of a mirrored storage device. Data is received for storage to a mirrored sage device including a first storage device and a second storage device 402. Both the first storage device and the second storage device may include a map of the present invention.

Operation of the first storage device, in this instance, the primary storage device, is suspended 404. Thus, to provide access to the data, the second storage device becomes the de facto primary device 406. A map is created including a map entry having an identifier, which describes a range of addressable data blocks 408. The map may be pre-allocated before device suspension to increase performance. The map is modified to describe changes to data blocks, such as creating and/or incrementing map entries 410. Thus, once the first storage device is re-established 412, the range of addressable data blocks described by the map is copied to the first storage device 414. When the block is successfully written to the mirror, the map entry may be decremented. The first storage device may then become the primary storage device again, the map reassigned to the second storage device 416. Thus, the present invention allows fast and efficient mirror re-establish following a device or communications failure. A trade-off of storage size for larger established data blocks results in an efficient, cost effective use of storage device memory.

Figure 5:
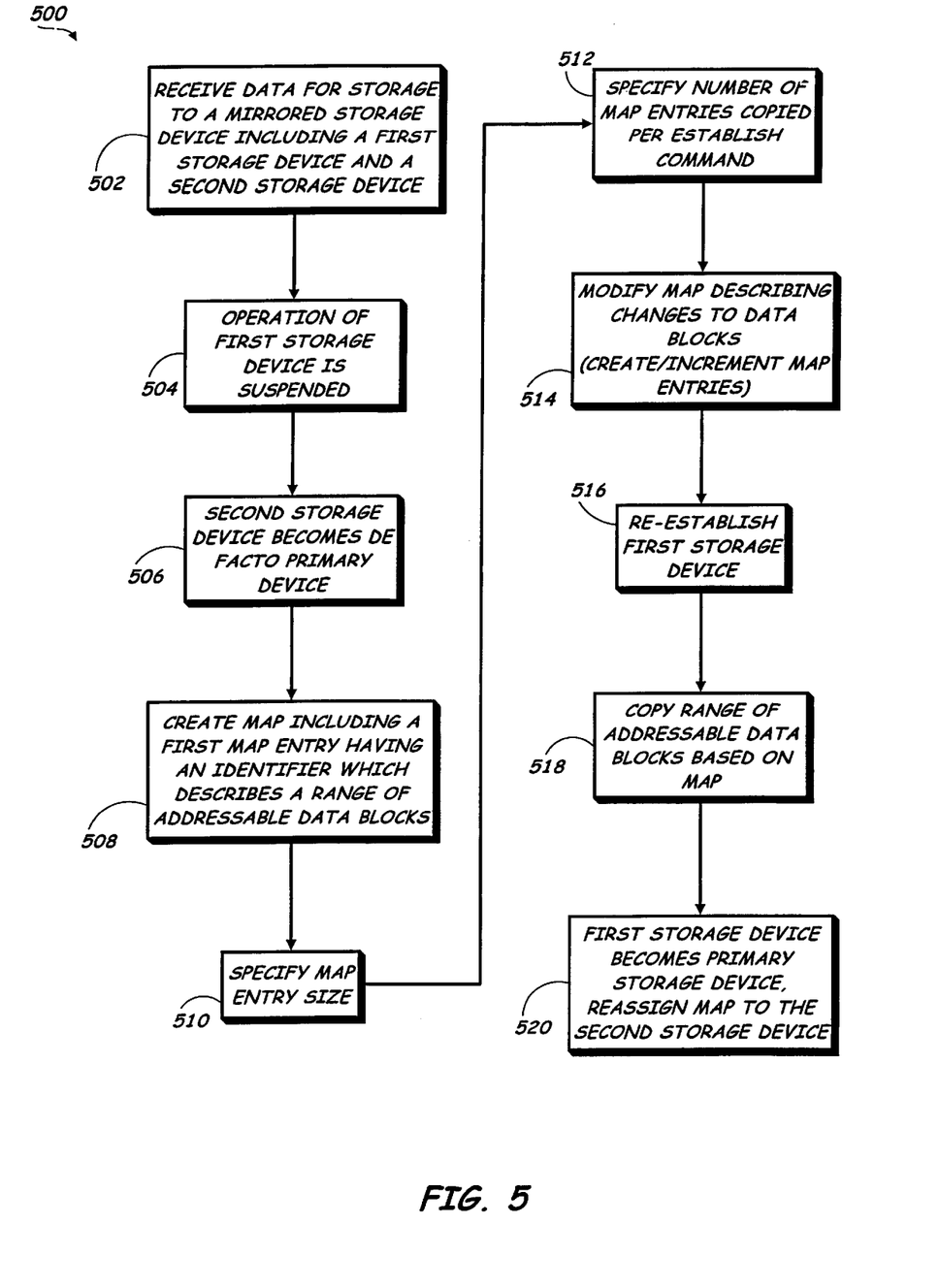
FIG. 5 is a flow chart illustrating an exemplary embodiment of the present invention wherein a user specifies both a number of map entries copied per establish command and a map entry size.

Referring now to FIG. 5, an exemplary method of the present invention is shown wherein a mirrored storage device is restored based upon a map including a map entry having an identifier which describes a range of addressable data blocks, wherein the range described by the identifier is specified and/or the number of map entries copied per establish command is specified. Data is received for storage to a mirrored storage device including a first storage device and a second storage device 502. Operation of the first storage device, in this instance, the primary storage device, is suspended 504. Thus, to provide access to the data, the second storage device becomes the de facto primary device 506. A map is created including a map entry having an identifier, which describes a range of addressable data blocks 508.

Additionally, in the present embodiment, the map entry size is specified 510. For example, the range of addressable data blocks described by an identifier may be specified depending on user and/or system needs, such as the amount of available space, the data transfer rate, and the like. Further, a number of map entries copied per establish command may be specified 512. Thus, a user may decrease or expand that ranges allow control over the granularity of an establish operation, and a user may concatenate ranges allowing for faster establish times by decreasing the number of distinct I/O operations. Thus, it should be apparent that a person of ordinary skill in the art may modify the ranges described by an identifier and/or the number of map elements copied without departing from the spirit and scope of the present invention.

Therefore, the map may be modified to describe changes to data blocks, such as creating and/or incrementing map entries 514. Once the first storage device is re-established 516, the range of addressable data blocks described by the map is copied to the first storage device 518. When the block is successfully written to the mirror, the map entry may be decremented. The first storage device may then become the primary storage device again, and the map reassigned to the second storage device 520. If should also be apparent that specifying a map entry size and number of map entries copied may be performed at various stages in the process without departing from the spirit and scope of the present invention, such as by specifying and then creating a map, creating a map and then specifying sizes based on available data storage space for the map, and the like.

Figure 6:
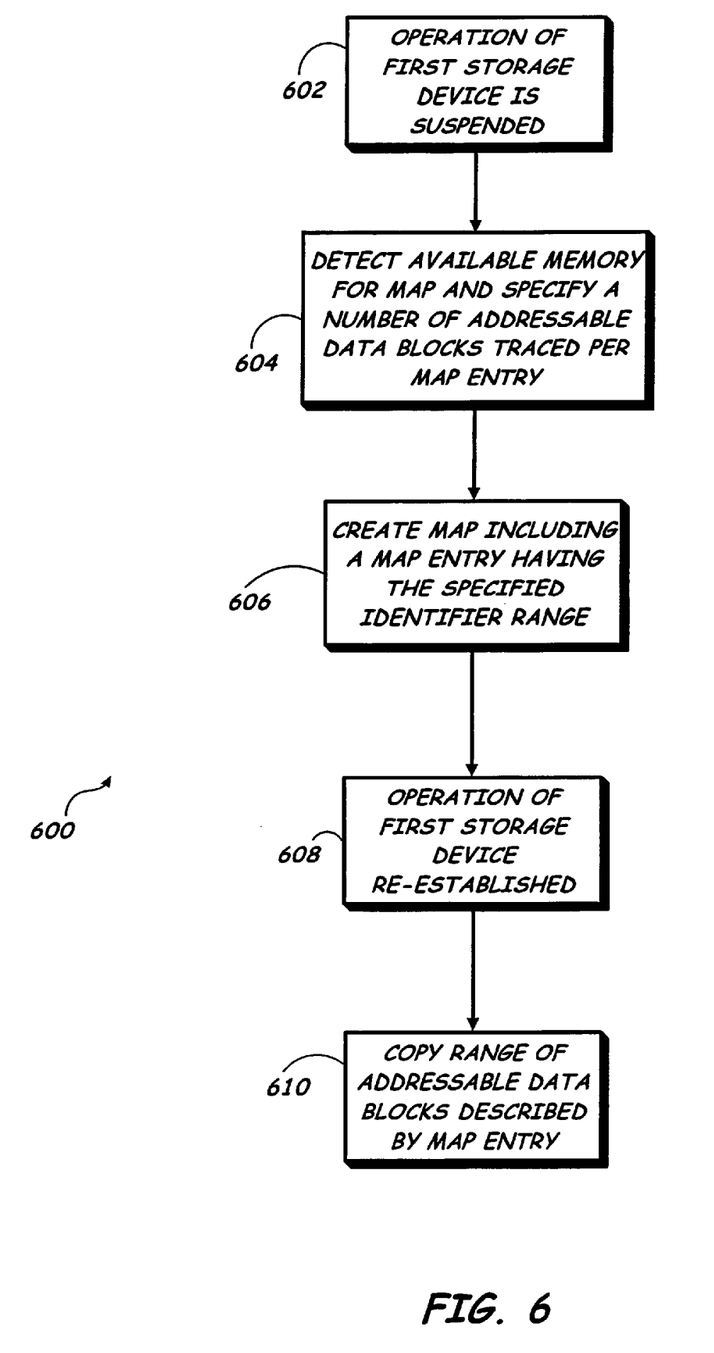
FIG. 6 is flow chart depicting an embodiment of the present invention wherein a map entry size is specified automatically.

Referring now to FIG. 6, an exemplary method 600 of the present invention is shown wherein a map entry size is specified automatically. Operation of a first storage device is suspended 602. Memory space available on a storage device suitable for inclusion of a map is detected 604. For instance, it may be desirable to utilize a specified percentage of the available storage space for a map, and the like. A map is created including map entries having the specified identifier range 606. Thus, once operation of the first storage device is re-established 608, or a new device, such as a third storage device becomes available, an establish command may be initiated in which a range of addressable data blocks described by a map entry is copied 610.

Figure 7:
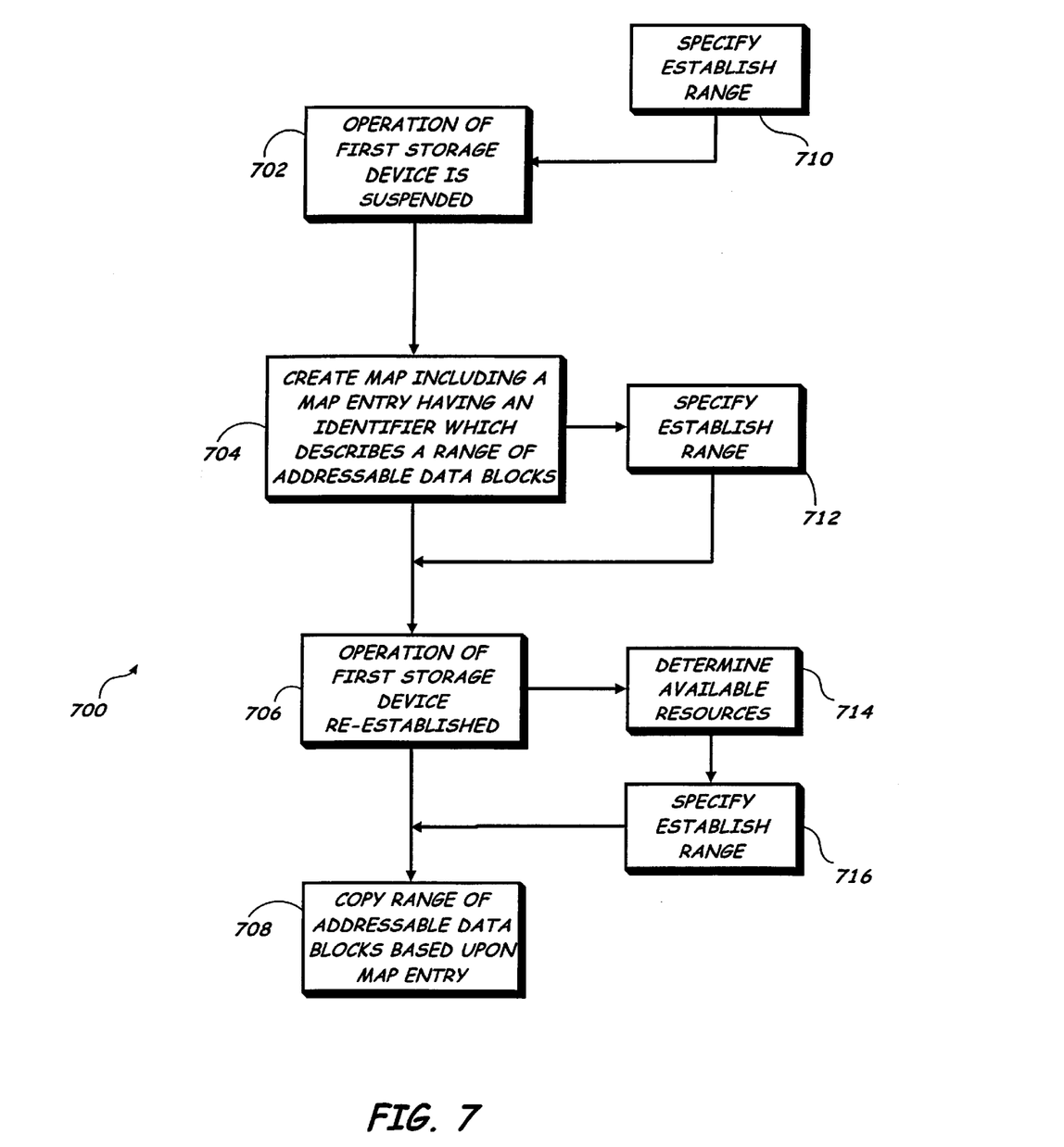
FIG. 7 is a flow chart describing an exemplary method of the present invention wherein a number of map elements copied per establish command is specified.

Further, a number of map elements copied per establish range may be specified as shown in the exemplary method 700 in FIG. 7. As before, operation of the first storage device may be suspended 704, such as due to operational failure, data transfer failure, and the like, thereby preventing the first storage device from receiving and storing data. A map is created, the map including a map entry having an identifier that describes a range of addressable data blocks 706. The map and the map entries include addressable data blocks that were modified after the suspension of the first storage device. Thus, once operation of the first storage device is re-established 708, such as by performing an establish operation, the range of addressable data blocks described by the map and the included map entries are copied to the first storage device 710. Additionally, it may be preferable to specify a number of map elements to achieve faster establish times.

For instance, an establish range may be specified 710 before operation of the first storage device is suspended, such as based on available resources such as data transfer, storage, and the like. Additionally, an establish range may be specified when a map is created 712. Further, an establish range may be specified 716 after operation of a first storage device is re-established 706, a new third storage device is made available, and the like, so that establish time may be optimized based on a determination of available resources 714 at the time the establish operation is to commence.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more information appliances or devices. Until required by the device, the set of instructions may be stored in another readable memory device, for example in a hard disk drive or in a removable memory such as an optical disk for utilization in a CD-ROM drive, a floppy disk for utilization in a floppy disk drive, a floppy/optical disk for utilization in a floppy/ optical drive, or a personal computer memory card for utilization in a personal computer card slot. Further, the set of instructions can be stored in the memory of a device and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order, or hierarchy of steps in the method can be rearranged while remaining within the scope of the present invention. The attached method claims present elements of the various steps in a sample order, and are not meant to be limited to the specific order or hierarchy presented.

It is believed that the system and method for synchronizing data mirrored by storage subsystems of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of tracking data changes to a mirrored storage system including a first storage device and a second storage device, comprising:

creating a map including at least one map entry having an identifier suitable for describing a range of addressable data blocks, wherein the range of addressable data blocks includes at least one data block modified after operation of the first storage device is suspended;

specifying at least one of a range of addressable data blocks described by at least one map entry of the map and a number of map elements copied per establish command; and storing the map including the at least one map entry on the second storage device, wherein the map is suitable for being utilized to restore data stored on the second storage device to at least one of the first storage device and a third storage device.

2. The method as described in claim 1, further comprising restoring at least one of the first storage device and a third storage device, wherein the map stored on the second storage device is suitable for being utilized to restore data stored on the second storage device to at least one of the first storage device and the third storage device so that data on the second storage device is mirrored by at least one of the first storage device and the third storage device.

3. The method as described in claim 1, wherein the map entry having the identifier suitable for describing a range of addressable data blocks is suitable for being adjusted so that at least one of the range described by the identifier is expanded thereby permitting a greater amount of addressable data blocks to be described by the map entry, thereby permitting a smaller map to be stored; and the range described by the identifier is reduced thereby permitting a lesser amount of addressable data blocks to be described by the map entry, thereby permitting a smaller amount of data to be copied to at least one of the first data storage device and the second data storage device.

4. The method as described in claim 3, wherein the range is expanded in response to memory space limitation of the second storage device.

5. The method as described in claim 1, wherein the identifier includes a number from zero to n, wherein n is a number of addressable data blocks in the range.

6. The method as described in claim 1, wherein the addressable data blocks are contiguous.

7. The method as described in claim 1, wherein a second data block is modified after suspension of the first storage device, when the second data block is included in the range described by the identifier, the map entry is not incremented, and when the second data block is not included in the range described by the identifier the map entry is incremented.

8. The method as described in claim 1, wherein the map is pre-allocated.

9. The method as described in claim 1, further comprising an establish command for establishes data blocks indicated by the at least one map entry on at least one of the first storage device and the third storage device.

10. A system for storing data, comprising:

a first storage device; and a second storage device, wherein the first storage device and the second storage device are suitable for receiving and storing data in a mirrored fashion and wherein operation of the first storage device is suspended, at least one map entry of a map including an identifier suitable for describing a range of addressable data blocks, modified after operation of the first storage device is suspended, is incremented, and wherein at least one of the range of addressable data blocks described by the map entry and a number of map entries copied per establish operation is specified.

11. The system as described in claim 10, further comprising restoring at least one of the first storage device and the third storage device, wherein the map stored on the second storage device is suitable for being utilized to restore data stored on the second storage device to at least one of the first storage device and the third storage device so that data on the second storage device is mirrored by at least one of the first storage device and the third storage device.

12. The system as described in claim 10, wherein the map entry having the identifier suitable for describing the range of addressable data blocks is specified so that at least one of the range described by the identifier is expanded thereby permitting a greater amount of addressable data blocks to be described by the map entry, thereby permitting a smaller map to be stored; and the range described by the identifier is reduced thereby permitting a lesser amount of addressable data blocks to be described by the map entry, thereby permitting a smaller amount of data to be copied to at least one of the first data storage device and the second data storage device.

13. The system as described in claim 12, wherein the range is expanded in response to memory space limitation of the second storage device.

14. The system as described in claim 10, wherein a second data block is modified after suspension of the first storage device:
   when the second data block is included in the range described by the identifier, the map entry is not incremented; and
   when the second data block is not included in the range described by the identifier the map entry is incremented.

15. A method of tracking data changes to mirrored storage devices including a first storage device and a second storage device, comprising:
   creating a map including at least one map entry having an identifier suitable for describing a range of addressable data blocks, wherein the range of addressable data blocks includes at least one data block modified after operation of the first storage device is suspended;
   storing the map including the at least one map entry on the second storage device, wherein the map is suitable for being utilized to restore data stored on the second storage device to at least one of the first storage device and a third storage device; and
   specifying a number of map elements copied per establish command.

16. The method as described in claim 15, further comprising receiving an establish command, wherein the establish command establishes data blocks indicated by the at least one map entry on at least one of the first storage device and the third storage device.

17. The method as described in claim 15, wherein the map entry having the identifier suitable for describing a range of addressable data blocks is suitable for being adjusted so that at least one of
   the range described by the identifier is expanded thereby permitting a greater amount of addressable data blocks to be described by the map entry, thereby permitting a smaller map to be stored; and
   the range described by the identifier is reduced thereby permitting a lesser amount of addressable data blocks to be described by the map entry, thereby permitting a smaller amount of data to be copied to at least one of the first data storage device and the second data storage device.

18. The method as described in claim 17, wherein the range is expanded in response to memory space limitation of the second storage device.

19. The method as described in claim 15, wherein the map is pre-allocated.

20. The method as described in claim 15, wherein the addressable data blocks are contiguous.

21. The method as described in claim 15, wherein a second data block is modified after suspension of the first storage device, when the second data block is included in the range described by the identifier, the map entry is not incremented, and when the second data block is not included in the range described by the identifier the map entry is incremented.

22. The method as described in claim 15, wherein restoring at least one of the first storage device and a third storage device is performed in response to when the map entry describes a range of addressable data blocks, addressable data blocks described by at least one map entry are copied from the second storage device to at least one of the first storage device and the third storage device.

23. A method of tracking data changes to a mirrored storage system including a first storage device and a second storage device, comprising:
   specifying at least one of a range of addressable data blocks described by at least one map entry of a map and a number of map elements copied per establish command;
   creating a map including at least one map entry having an identifier suitable for describing a range of addressable data blocks, wherein the range of addressable data blocks includes at least one data block modified after operation of the first storage device is suspended; and
   storing the map including the at least one map entry on the second storage device, wherein the map is suitable for being utilized to restore data stored on the second storage device to at least one of the first storage device and a third storage device.

* * * * *